July 3, 1956
M. A. HALVERSON
2,753,193
TRAILER HITCH AND MOUNTING BRACKET MEANS THEREFOR
Filed July 11, 1955
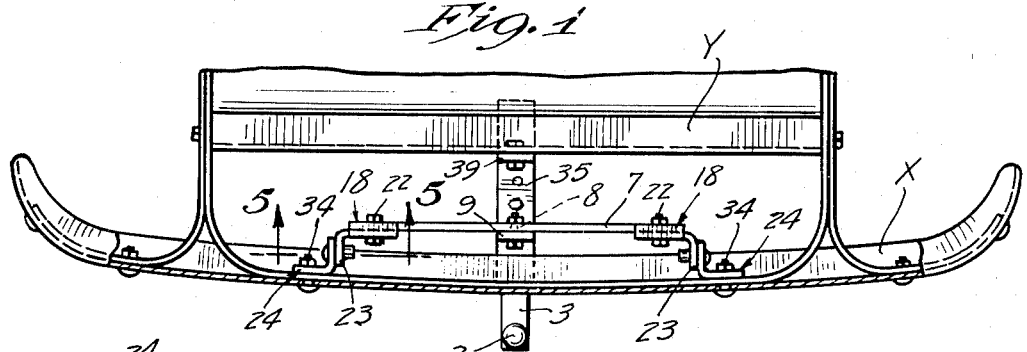
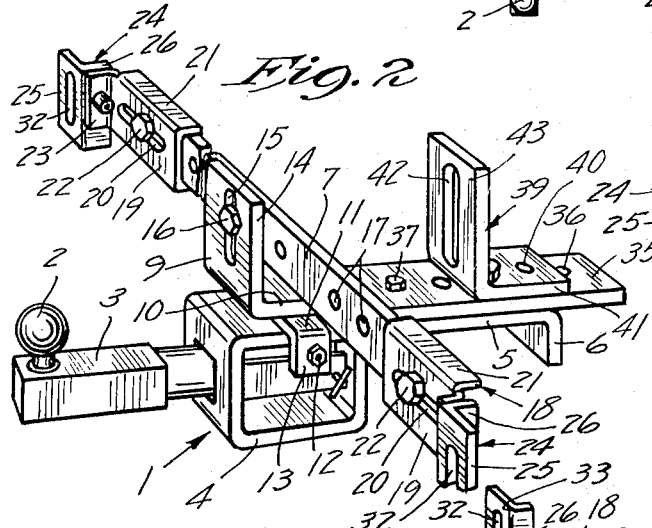
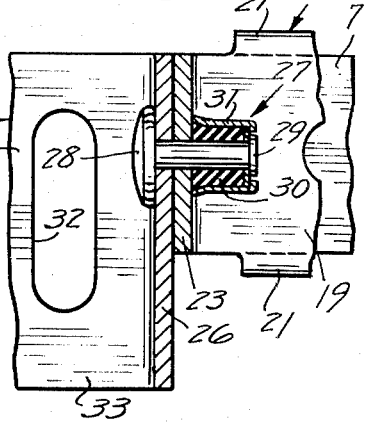
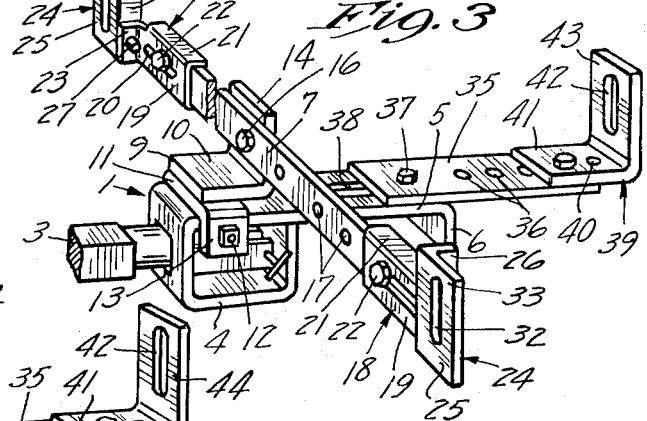
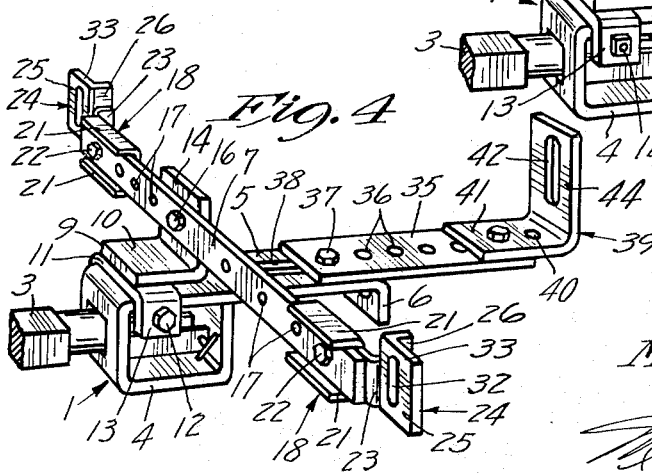
INVENTOR.
Milton A. Halverson
BY
Merchant & Merchant
ATTORNEYS

United States Patent Office 2,753,193
Patented July 3, 1956

2,753,193

TRAILER HITCH AND MOUNTING BRACKET MEANS THEREFOR

Milton A. Halverson, Brainerd, Minn., assignor to Design-Rite Company, Brainerd, Minn., a corporation of Minnesota Application July 11, 1955, Serial No. 521,222

8 Claims. (Cl. 280—501)

My invention relates to trailer hitches for automotive vehicles and, more particularly, to approved attachment brackets for same. Trailer hitches are conventionally attached to the rear end of the automotive vehicle between the rear frame member and the rear bumper. However, in view of the variations in structure, size and space, found not only in various makes of motor vehicles but also in different models of the same maker, it has heretofore been very difficult for manufacturers of trailer hitches to provide attachment brackets. A few such manufacturers have attempted to furnish a sufficiently large number of parts and pieces so as to enable the trailer hitch, sold therewith, to be installed on most makes of cars. However, this approach is costly, and requires considerable instruction and directions.

In most other instances special custom brackets are made for each automobile as the trailer hitch is sold. This procedure is obviously also costly and time-consuming.

The object of my invention is the provision of a universal attachment bracket for trailer hitches which may be utilized on substantially all automotive vehicles presently being produced.

A still further object of my invention is the provision of a device of the class described which is relatively inexpensive to produce, is relatively light in weight yet is rugged and durable in construction.

A still further object of my invention is the provision of a device of the class described which is extremely simple, and requires a minimum of instruction and time to install.

The above and still further objects of my invention will become apparent from the following detailed specification, appended claims, and attached drawings.

Referring to the drawings, wherein like parts are indicated by like characters throughout the several views:

Fig. 1 is a fragmentary view in plan of the rear end portion of an automotive vehicle showing my novel bracket in position between the bumper and rear frame member;

Fig. 2 is a perspective view of my novel structure showing one method of use thereof;

Fig. 3 is a view corresponding to Fig. 2 showing a different arrangement of some of the parts, some parts being broken away and some parts shown in section;

Fig. 4 is a view corresponding to Fig. 3 but showing a still different arrangement of some of the parts thereof; and Fig. 5 is a fragmentary sectional view taken substantially on the line 5—5 of Fig. 1.

Referring with greater particularity to the drawings, numeral 1 indicates in its entirety a trailer hitch, including a hitch ball 2 and mounting means therefor. Said mounting means includes drawbar 3 to the rear end of which the ball 2 is rigidly secured. Drawbar 3 is longitudinally slidably mounted in an open-sided box-like frame 4, preferably and as shown formed from a single strap of steel or the like, and having a tongue portion 5 which extends longitudinally of the vehicle and which has a downturned end portion 6 for purposes of imparting rigidity thereto. Hitch 1 is of a type disclosed in my co-pending application, Serial No. 377,119. However, it is to be understood that my attachment bracket hereinafter to be described is not limited to such structure and, in fact, may be used with hitches of any type.

Bracket means for the trailer hitch 1 includes an elongated horizontally disposed bar 7 having means at its intermediate portion in the nature of an aperture 8 for detachably securing same to the trailer hitch 1. In detail, this is attached through the medium of an angle iron 9, the horizontal portion 10 of which is rigidly secured to an inverted U-shaped channel iron 11. A nut-equipped bolt 12 projects through aligned openings in the depending parallel flanges 13 of the channel iron 11 and underlies the rear end of the tongue 5 within the box-like frame 4. The upstanding flange 14 of the angle iron 10 is provided with a vertically extended slot 15 for the reception of a nut-equipped headed bolt 16. This particular arrangement of parts makes it possible to attach the bar 7 to substantially all makes of trailer hitches.

Bar 7 at opposite sides of its longitudinal center is provided with a plurality of longitudinally spaced openings 17 extending transversely therethrough. Shoes 18 each including an elongated vertically disposed sole plate portion 19 having a centrally disposed longitudinally extended slot 20, and longitudinally extending angular side flanges 21, define laterally opening channels for slidably receiving the outer end portions of the bar 7. Nut-equipped headed bolts 22 are adapted to extend through the elongated slots 20 in the sole plate portions 19, and through a selected one of the apertures 17 extending transversely through the bar 7. At their outer end portions the sole portions 19 of the shoes 18 are provided with end flanges 23 which project laterally outwardly in the direction opposite that of the side flanges 21. A pair of angular anchoring ears 24 each including a flange 25 and a lip 26 are pivotally connected one each to the end flanges 23 carried by the shoes 18, as indicated at 27.

It will be noted that the ears 24 are elongated in a direction transversely of the axis of the pivotal connection 27, and that the pivotal connection is offset from the longitudinal center of the ears 23, for a purpose which will hereinafter become apparent. Particularly and as shown in Fig. 5, pivotal connection 27 comprises a pivot pin or rivet 28, the inner head end 29 of which overlies and retains in compression a rubber grommet 30 having bonded thereto a cylinderical jacket 31. The grommet 30 is under compression to frictionally engage the shank of the rivet 28 and the ear 26. This arrangement frictionally holds the anchoring ears 24 against accidental rotation. The flanges 25 of the ears 24 are provided with longitudinally extended elongated slots 32.

The bar 7 and parts carried thereby including the shoes 18 and ears 24 are adapted to secure the rear end portion of the trailer hitch 1 to the rear bumper of automotive vehicles of various makes, and the great versatility thereof is illustrated by Figs. 2–4, inclusive. In Fig. 2 the bar 7 is positioned so that the sole plate portions 19 thereof face rearwardly. It will also be noted that the elongated ears 24 are rotated on the pivotal connections 27 so that the offset ends 33 project downwardly. Bar 7 may be attached to a considerable number of vehicles with this arrangement by longitudinal adjustment of the shoes 18 on the bar 7. Note that the slots 20 in the sole plate 19 and the longitudinally spaced opening 17 provide for infinite adjustment longitudinally of an automotive vehicle bumper X, by vertical adjustment of the bar 7 with respect to the angle iron 9 and by vertical adjustment of the bumper bolts in the slots 32 of the ears 24.

In Fig. 3, it will be noted that the angle iron 9 and the inverted U-shaped channel iron 11 have been reversed and the bar 7 has been inverted and turned end to end. This arrangement, together with the adjustments provided by the slots 15, 20, and 32 also enables the bar 7 to be secured to quite a wide range of bumper bolts 34 carried by the rear bumper X.

In Fig. 4 the bar 7 has been inverted and the ears 24 have been rotated 180 degrees on the axis of the pivotal connections 27. However, in some instances one may find that it is necessary or desirable to invert only the bar 7 or the ears 24.

For the purpose of securing the front end portion of the trailer hitch 1 to a transverse rear frame member Y of an automotive vehicle, I provide a rigid elongated arm 35 having a plurality of longitudinally spaced openings 36 thereon. For the purpose of adjustably securing the arm 35 to the rearwardly tongue portion 5 a nut-equipped bolt 37 is passed through a selected one of the openings 36 and through a longitudinally extended slot 38 in the tongue 5. Finally an angle iron 39, preferably and as shown having a plurality of spaced openings 40 in its horizontal leg 41 and a vertically extended slot 42 in its vertical leg 43, is secured to the arm 35 by means of a nut-equipped bolt extending through one of the openings 40 and a selected opening 36. Figs. 2, 3, and 4 demonstrate numerous adjustments which may be made to adapt the same to practically all vehicles on the market.

My invention has been thoroughly tested and found to be completely satisfactory for the accomplishment of the above objects, and while I have disclosed a preferred embodiment thereof it should be obvious that same is capable of modification without departure from the scope of the appended claims.

What I claim is:

1. Universal bracket means for trailer hitches including a hitch ball and a mounting therefor, said bracket means comprising, an elongated horizontally disposed bar having supporting means intermediate its ends for attachment to said hitch ball mounting, a pair of shoes, means for slidably mounting one each of said shoes for longitudinal extending and retracting movements on said bar laterally outwardly of an opposite side of said supporting means, means for releasably locking said shoes in desired set extended or retracted positions, and a pair of angular anchoring ears one each secured to one of said shoes for pivotal movements with respect thereto about an axis parallel to the longitudinal dimension of said bar, said anchoring ears each including a flange adapted to be secured to a portion of an automotive vehicle bumper whereby the flanges are spaced apart laterally of the vehicle.

2. The structure defined in claim 1 in which each of said ears is elongated in a direction transversely of said axis, said axis being offset from the center of the longitudinal dimension of said ear.

3. The structure defined in claim 2 in which the flanges on said ears are each provided with a slot adapted to receive an anchoring bolt, said slot extending in a direction transversely of the axis of its respective ear.

4. Universal bracket means for trailer hitches including a hitch ball and a mounting therefor, said bracket means comprising, an elongated horizontally disposed bar having supporting means intermediate its ends for attachment to said hitch ball mounting, a pair of shoes, means for longitudinally slidably mounting one each of said shoes at an opposite end portion of said bar for extending and retracting movements longitudinally of said bar, means for releasably locking said shoes in set extended or retracted positions, and a pair of angular anchoring ears one each secured to one of said shoes for pivotal movements with respect thereto about an axis parallel to the longitudinal dimension of said bar, said anchoring ears each including a flange adapted to be secured to an automotive vehicle bumper on opposite sides of the longitudinal center thereof.

5. Universal bracket means for trailer hitches including a hitch ball and a mounting therefor, said bracket means comprising an elongated horizontally extending bar having supporting means at its longitudinally central portion for attachment to said hitch ball mounting, said bar having a plurality of longitudinally spaced openings extending transversely therethrough at opposite sides of its longitudinally central portion, a pair of shoes one each longitudinally slidably engaging said bar longitudinally outwardly of an opposite side of said supporting means, each of said shoes having an aperture adapted to register with a selected one of the openings in the adjacent portion of said bar, a pair of releasable locking devices one each extending through the aperture of a different one of said shoes and the opening in said bar in register therewith, each said locking device, when released, permitting limited movement of said shoe longitudinally of said bar, a pair of angular anchoring ears, and means pivotally mounting each of said ears to one of said shoes for pivotal movements with respect thereto about an axis parallel to the longitudinal dimension of said bar, said anchoring ears each including a flange adapted to be secured to an automotive vehicle bumper on opposite sides of the longitudinal center thereof.

6. The structure defined in claim 5 in which each of said shoes comprises, a flat intermediate sole plate portion and a pair of longitudinally extending angular side flanges at opposite side edges of said sole plate portion, said portion and flanges defining a laterally opening channel for slidably receiving said bar, and an end flange projecting laterally outwardly from one end of said sole plate portion in the opposite direction from said side flanges, said last-mentioned means pivotally mounting said anchoring ears to said end flanges.

7. The structure defined in claim 6 in which the means for pivotally mounting said anchoring ears to said shoes includes a compressible device for frictionally restraining said anchoring ears against pivotal movement with respect to said shoes.

8. The structure defined in claim 1 in which said supporting means includes angle iron having horizontal and vertical portions, said vertical portion being provided with a vertically extended slot and said horizontal portion having spaced depending flanges, adapted to receive therebetween a portion of the trailer hitch, and a clamping bolt adapted to pass through aligned openings in said flanges and underlie a portion of said trailer hitch to releasably lock the same between said depending flanges.

References Cited in the file of this patent

UNITED STATES PATENTS 1,816,121    MacLamarrah _____ July 28, 1931

FOREIGN PATENTS 522,812    Great Britain _____ June 27, 1940